United States Patent [19]

Hoekstra

[11] Patent Number: 5,602,849
[45] Date of Patent: Feb. 11, 1997

[54] COMMUNICATION BUS SYSTEM AND STATION FOR USE IN SUCH SYSTEM

[75] Inventor: Jelle Hoekstra, Eindhoven, Netherlands

[73] Assignee: D2B Systems Company Limited, Redhill-Surrey, United Kingdom

[21] Appl. No.: 416,824

[22] PCT Filed: Aug. 15, 1995

[86] PCT No.: PCT/IB94/00250

§ 371 Date: Apr. 17, 1995

§ 102(e) Date: Apr. 17, 1995

[87] PCT Pub. No.: WO95/05636

PCT Pub. Date: Feb. 23, 1995

[30] Foreign Application Priority Data

Aug. 16, 1993 [GB] United Kingdom ............... 9316996

[51] Int. Cl.⁶ ..................................................... H04J 3/02
[52] U.S. Cl. ............................................. 370/462; 370/471
[58] Field of Search .................................. 370/85.1, 85.2, 370/85.6, 85.13, 60, 94.1, 110.1, 17

[56] References Cited

U.S. PATENT DOCUMENTS

| | | | |
|---|---|---|---|
| 4,937,816 | 6/1990 | Van Steenbrugge et al. | 370/85.6 |
| 5,128,936 | 7/1992 | Van Steenbrugge et al. | 370/85.6 |
| 5,249,182 | 9/1993 | Van Steenbrugge et al. | 370/85.2 |
| 5,448,593 | 9/1995 | Hill | 370/60 |
| 5,469,435 | 11/1995 | Krein et al. | 370/85.2 |
| 5,473,606 | 12/1995 | Hoekstra | 370/85.2 |

*Primary Examiner*—Douglas W. Olms
*Assistant Examiner*—Shick Hom

[57] ABSTRACT

A multistation single-channel communication bus system accommodating master stations and slave stations, with any master performing arbitration, arbitration outcome detection, and, upon winning the arbitration, formatting a frame having a slave address and slave control signals, and accommodating data byte periods for data transmission from a transmitter station to a receiver station up to a first maximum data byte length. Each period accommodating an acknowledge bit from the receiver station. The transmitter station responding to the absence of the acknowledge bit for a particular data byte by repeating that data byte. The system, for a message whose data byte length would exceed the first maximum, divides the message into partial messages each of an associated frame data byte count below the first maximum, and assigns each partial message to a respective bus frame. The system counts, in a particular frame, data byte periods and received acknowledge bits. The transmitter station, upon attaining the first maximum earlier by the data byte periods than the frame data byte count by the acknowledge bits, signalling a frame failure and ignoring any transfer in the particular frame for undertaking a repeat thereof.

6 Claims, 2 Drawing Sheets

COMMUNICATION BUS SYSTEM AND STATION FOR USE IN SUCH SYSTEM

BACKGROUND TO THE INVENTION

The invention relates to a multistation single-channel communication bus system accommodating master stations and slave stations, any master station comprising arbitration means, arbitration outcome detection means, and formatting means for upon winning said arbitration formatting a frame comprising slave address and slave control signalizations and accommodating a plurality of data byte periods for data transmission from a transmitter station to a receiver station up to a first maximum, and each period accommodating an acknowledge bit from said receiver station, said transmitter station being arranged for upon absence of such acknowledge bit for a particular data byte repeating that data byte. Generally, such comunication systems impose a maximum value on the allowable length of a frame, so that a particular master station cannot keep the whole system engaged for more than a reasonable interval of time. The consequence of this is that if a master station wants to send a long message to a particular slave station, or receive such message from a slave transmitter station, this is done in a sequence of frames that collectively constitute the message. In such case, the master station in question is often enabled to keep an addressed slave station free from accessing by other master stations between successive frames of the message. For this object, the locking mechanism has been proposed, such as described, for example, in U.S. Pat. No. 5,128,936 (PHN 12484) assigned to the assignee of the present application for patent and herein incorporated by reference. In the reference, the transfer reliability is enhanced, in that the receiver station directly after successful reception of a particular data byte responds with an acknowledge bit. If the acknowledge bit does not appear, the transmitter will repeat the data byte in question. The acknowledge bit may be absent for a variety of reasons, such as receive buffer full, parity wrong, or electrical interference. The policy viz á viz slave address and slave control acknowledge is different, but this is ignored here.

Now, the locking and unlocking signalizations are in the head of the frame. This has led to the procedure of transmitting the ultimate data byte of a message, together with the unlocking signalization, in a separate frame. The additional frame causes extra bus load, especially in such cases where the probability that the frame length would actually be exceeded is only small, so that the necessity for the lock is scant. In consequence, for relatively short messages, the locking may be foregone. This however, leads to a new problem, in that the data receiver can only process the message when it has been received completely. However, this completing can be thwarted in various ways, such as by a higher priority master that accesses the same slave, and continually wins the arbitrage. The latter access could effectively be refused by the slave in question, because it is busy. Alternatively, to allow the slave station to converse with two masters in alternation poses a severe bookkeeping requirement to the software. All these problems of course multiply with the number of master stations.

SUMMARY OF THE INVENTION

Therefore, amongst other things, it is an object of the present invention to allow transfer of relatively short messages in a system of the kind considered, wherein the locking mechanism is not necessary, while still maintaining coherence of the complete message without necessitating a complex data management in the receiver. Now, according to one of its aspects, the invention is characterized in that said system is arranged for with respect to intended transfer of a message whose data byte length would exceed said first maximum dividing said message into partial messages each of an associated frame data byte count below said first maximum, and assigning each partial message to a respective bus frame, said system having counting means for counting in a particular frame data byte periods and received acknowledge bits, said transmitter station being arranged for upon attaining said first maximum earlier by said data byte periods than said frame data byte count by said acknowledge bits signalling a frame failure and ignoring any transfer in said particular frame for undertaking a repeat therefor. In consequence, short messages are nearly always received in full. A failed frame is simply repeated, so that the receiver (usually the slave station, but the invention is not restricted to the identity of master and transmitter) need not wait for completion of the message.

Advantageously, if necessary a message is divided into partial messages of mutually equal lengths. This improves transfer statistics. Advantageously, the maximum length of a partial message is appreciably lower than the length of a frame, which increases the probability for success. Advantageously, if the length of a message would only approach the maximum length of a frame, it is distributed into partial messages. For example, if the frame boundary is 32 bytes, the maximum (partial) message length may be restricted to values such as 16 bytes, but other values, such as 20, 24, or 28 could apply as well. It is not necessary that this maximum length should be uniform. It may depend on the identity of the receiver station, upon the critical nature or complex processing requirements for the message in question, the momentary bus load, or other parameters.

The invention also relates to a transmitter station for use in such system. Further advantageous aspects are recited in dependent Claims.

BRIEF DESCRIPTION OF THE DRAWINGS

These and other aspects and advantages of the invention will become apparent with reference to the description of a preferred embodiment hereinafter, and in particular with reference to the appended drawing that shows.

DESCRIPTION OF THE PREFERRED EMBODIMENT

Figure 1:
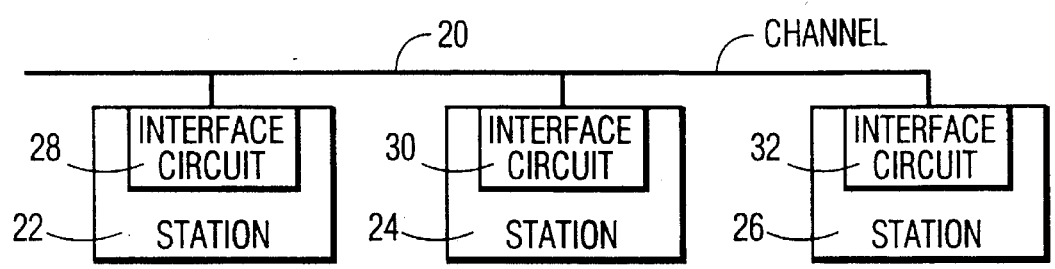
FIG. 1 is a general representation of a single-channel communication bus system.

FIG. 1 is a general representation of a single-channel communication bus system. Line 20 represents the channel, for example a twisted pair of conductors. There are provided three stations 22, 24, 26, each of which comprises a respective interface circuit 28, 30, 32. The stations may be of various complexities. Apparatus of this kind may be simple or complex, for example a television receiver, a washing machine, a microwave oven, a central timer, a sensor for ambient temperature/solar radiation, an illumination (sub-)system. Some apparatus will act as a master station viz á viz the bus, and other apparatus as a slave station. Some apparatus act as transmitters of data, and some apparatus as receivers. The operations described below take place on the communication bus system and are executed by the interface circuits.

DESCRIPTION OF THE BUS PROTOCOL

Figure 2:
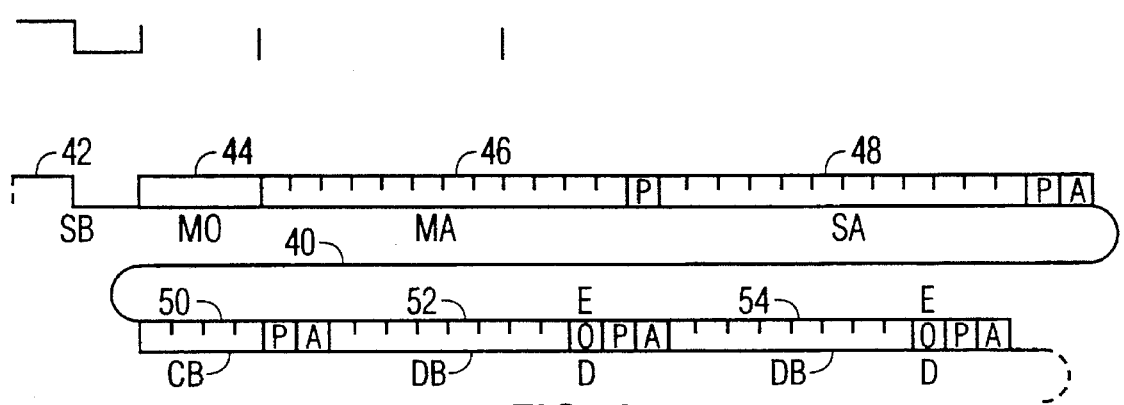
FIG. 2 shows the structure of a communication operation.

FIG. 2 shows the structure of a communication operation at the frame level. The Figure shows the time axis as a meandering line 40 along which the bit cells are assumed to be arranged in a contiguous manner. The reference numeral 42 indicates the start bit. The reference numeral 44 concerns the mode indication which indicates the bit rate at which subsequently data is to be transmitted; this concerns 3 bits at the most. A limited number of standardized transmission frequencies have been defined. The reference numeral 46 indicates the address of the relevant master station; this address contains 12 bits, followed by a parity bit P. An arbitration operation is performed on the mode indication, and on the master address. For the mode choice the lowest (=slowest) mode prevails. For the addresses the station having the highest priority prevails. Mode indication and master address together constitute a priority signal. After the transmission of the master address, only one master station remains. This station subsequently transmits the slave address 48. This address contains 12 address bits, one parity bit P and space for an address acknowledge bit A. When a slave station recognizes its own address, it transmits an address acknowledge bit in the block A. When the latter bit is not received, the intended slave station is either absent or does not operate, or the address has an incorrect parity. In that case the frame shown in FIG. 2 is immediately terminated. When the acknowledgement by the slave station is correct, the master station transmits a control signal 50. This signal contains four control bits, one parity bit P and space for a control acknowledge bit A. The treatment of the P and A bits is identical to that in the case of the slave address. If the control acknowledge bit does not appear, the frame is directly terminated. When the acknowledgement by the slave station is correct, a data byte is transmitted (52). The description will be based on a master transmitter station. The data byte contains 8 bits, a signalling "last" data byte (EOD), one parity bit P and space for a data acknowledge bit A. The EOD signalling indicates whether the transmitter station considers the byte concerned as the last byte or as a non-last byte of the message. The frame length amounts to at the most 2 bytes in mode 0; in mode 1 it amounts to 32 bytes from (master station) or 16 bytes from (slave station); in the mode 2 it amounts to 128 bytes from (master station) or 64 bytes from (slave station), but shorter messages are also permissible. The parity bit P is determined also on the basis of the EOD bit. If the data acknowledge bit is not received, there may be a variety of reasons: a parity error, slave station deactivated since the reception of the control signal 50, or slave station incapable of receiving and buffering the data byte, for example because the processing of the data had taken too much time. In all these cases the master station is set to the repeat state. In this state the relevant data byte, including the facilities for EOD, P, A, is repeated until ultimately the data acknowledge bit is received. Then, if the relevant data byte was not the last byte, the repeat sate is left and the next data byte is transmitted (for example 54). If, however, it was the last data byte, the frame and the message are terminated. Subsequently a new message/frame may commence. Upon transmission of a data byte, each time a counter position is incremented. When the counter reaches the maximum frame length, or when the message is completed, the "last" data byte is indicated (the first one of the two limits occurring is decisive). The frame is terminated after the "last" byte. If the data acknowledge bit is not correctly received after the "last" byte, the "last" byte is repeated, for as long as it fits within the defined frame length. When the message has not yet been completed when the maximum frame length is reached, a new frame is started. The first data byte thereof is taken as the first not yet transmitted data byte of the message, or as the data byte for which no correct data acknowledge bit had yet been received. Consequently, this implies no double transmission of a data byte already transmitted successfully. Normally, the "lock" mechanism is used in this respect, so that the relevant slave remains reserved for the actual transmission. This will be described in detail hereinafter. According to this lock mechanism, another master station having a higher priority can meanwhile obtain the monopoly over the bus, but cannot gain access to the slave station that had been locked. This organization simplifies the procedure in the slave station.

FURTHER ORGANIZATIONS

The master station can set/reset the lock flag at the slave by means of a given control signal, thus instructing the slave to listen only to the master station concerned. The slave station is unlocked by the master station in that the latter transmits a 1-byte-data frame, containing the release or unlock command. The lock flag should be set/reset by the slave after at least 1 byte of the associated frame has been correctly transmitted/communicated.

A slave address acknowledge bit is not given if:

the slave is absent the slave cannot handle the mode (speed) of the frame a parity error occurs in the master address and/or slave address timing is incorrect, causing bus errors, so that synchronization or parity errors occur.

The master responds to a negative address acknowledge bit by either repeating the frame, possibly in a lower mode requesting the status for the relevant slave in the mode 0 (possibly repeatedly). The highest mode in which the slave can operate is derived from the status. Subsequently the message is repeated in the highest feasible mode.

When the transmission repeatedly stops at the negative slave address acknowledge bit, it must be concluded that the slave is absent. In that case further repetition does not make sense.

A control acknowledge bit is not given in the case of:

parity error timing error inability of the slave to execute the requested function.

The master may respond by repeating the message in first instance. If again no control acknowledge bit is received, it requests the master station at the slave in order to determine why it did not receive this acknowledge bit.

A negative data acknowledge bit is caused by:

parity error timing error full receiver buffer.

In the case of a parity error or in the case of a full receiver buffer, this byte will be repeated, as far as possible, until either the byte has been acknowledged or the frame length has been used up. If the byte has not been transmitted within the frame, a new frame will be initiated for this byte.

The following control signals are defined:

HEX 0(0000): read the status of the interface circuit of the slave station. If this operation is not followed by an acknowledge signal, the conclusion is that the interface circuit of the slave station is defective. However, a repeat operation may be undertaken. If correct acknowledgement is received, the slave station subsequently outputs a data byte in which its status is shown.

HEX 2(0010): read the status and apply the lock signal to the slave station. When the slave station is locked by another master station, this circumstance is signalled in the data byte; the requesting master must attempt again.

HEX 3(0011): read data and apply the lock signal to the slave station. If no answer is received, the status is interrogated, which is specified as follows:

bit 0=0: the transmitter buffer of the slave station is empty; this is signalled to the control system bit 2=1: the slave station is locked by another station; the control system receives the instruction to attempt again bit 4=0: the slave station cannot transmit data; this is signalled to the control system. In all other cases for the bits 0, 2, 4 a new frame is initiated with the same control code.

HEX 4(0100): read the two least-significant tetrades of the address whereto the slave station is locked. If the slave station is not locked, this fact is signalled to the control system of the master, by means of a negative acknowledge bit.

HEX 5(0101): ditto for the most-significant tetrade.

HEX 6(0110): read the status of the slave and unlock. If the slave station is locked by another master station, this is signalled by a negative acknowledge bit, and the master stops its attempts.

HEX 7(0111): read the data and unlock. Except for the unlock, this corresponds to the code 0011.

HEX 8(1000): write possession request; if a negative acknowledge bit ensues, a query for the properties/status of the slave station is made. The latter are interpreted as follows:

bit 1=1: the receiver buffer of the slave is not empty; signal to the control system of the master station.

bit 2=1: as above.

bit 3=0: slave does not have a memory which means that the slave is not able to answer requests for property/status.

If none of the three bits has a result, a new attempt is made.

HEX A(1010): write command and lock. Subsequently the status is read, in case of a negative acknowledge bit, interpreted as follows:

bits 1, 2 as above; if none of these bits has a result, a new attempt is made.

HEX B(1011): write data and lock. Subsequently the status is read, in case of a negative acknowledge bit; interpretation is the same as with HEX A.

HEX E(1110): write command and unlock; remainder is identical to HEX A.

HEX F(1111): write data and unlock; remainder is identical to HEX A.

At the end of each frame the transmitting station (slave station or master station) checks whether all necessary bytes have been transmitted. If this is not the case, the master station starts a new frame and the transmitting station loads the remaining bytes into the local transmitter buffer.

DESCRIPTION OF AN INTERFACE CIRCUIT

Figure 3:
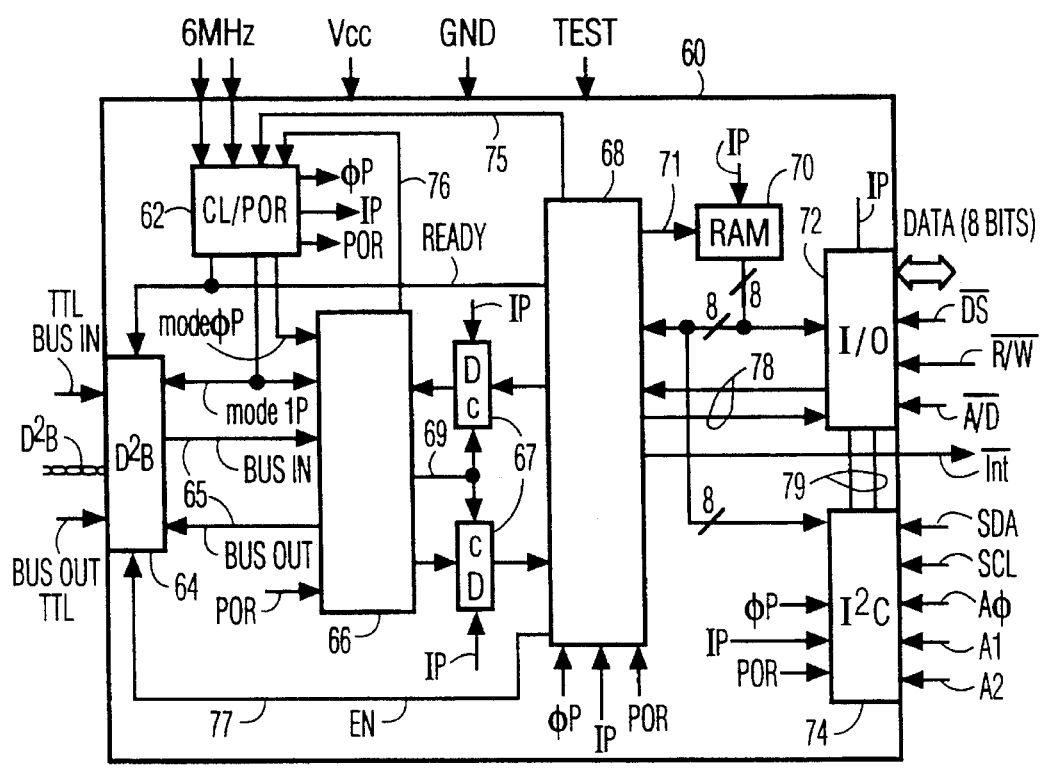
FIG. 3 shows an embodiment of an interface circuit.

FIG. 3 shows an embodiment of an interface circuit. The circuit (60) comprises the following connections, viewed clock-wise from the oscillator (6 MHz): —power supply VCC, ground GND, test control test, 8 bits data for the local control system, with a synchronization (strobe) pin $\overline{DS}$, read/write control R/$\overline{W}$, selection between address and data (A/$\overline{D}$), an interrupt signal Int, three preset address bits therefor (A0, A1, A2), two lines for data at the TTL level, and a twisted wire pair for the single-channel communication ($D^2B$) as described above. Element 62 comprises the clock and the control components for the resetting of the circuit when the supply voltage appears (POR=Power-On Reset). A "chip-ready" signal, the POR signal and the clock signals 0P, 1P originate herefrom. The "chip-ready" signal indicates that the circuit is operational again after power on and reset.

Block 64 is a circuit for the filtering, detection and controlling of signals on the $D^2B$ and TTL lines. The data contents of the signals on $D^2B$ and TTL are identical, except for the following electrical differences: TTL is unidirectional versus $D^2B$ which is bidirectional, and the voltage levels differ. On lines 65 the line bits are transported at the TTL level. In block 66 a translation takes place between the line bits and the logic bits. The blocks 67 constitute two unidirectional latch circuits between the blocks 66 and 68. Line 69 carries a signal for activating the next bit. Block 68 constitutes the core of the interface circuit. Therein the parity bits are formed, the acknowledge bits are detected and the various control bits and status bits are analyzed or stored for interrogation, if any. Furthermore, the information is exchanged with the control system and the interaction with RAM buffer 70 is organized. Buffer 70 has a data width of 8 bits; the number of bytes is determined by the application. The addresses appear on line 71; block 72 is a data gate having a width of 8 bits for connection to the local control system (not shown). The signals mode 0P, 1P, are secondary clock signals having the same frequency as 0P, 1P, or a frequency which is a factor 4 lower, depending on the operation mode on the external bus $D^2B$. Line 76 controls the switching over of the clock to the bit level for the various bit lengths, which need not be the same for the start bit, mode/address/control bits and data bits. Line 75 has the same function at the frame level. Line 77 is an enable line (EN); lines 78 and 79 provide synchronization handshake.

In a simple embodiment the circuit is suitable for use in the mode 0 and 1; moreover, it is suitable for master operation as well as slave operation. After a reset signal (power-on-reset, POR), the circuit is initialized. The microprocessor can make the address of the circuit available to the interface circuit by loading of some free-accessible registers. Moreover, some flag bits which indicate the capacities of the application are set (when a local memory is present and the slave station can also act as a transmitter). The signal POR also causes an interrupt signal for the local control system. The bus status of the slave part of the circuit is stored in the slave status register. When the circuit is locked by another station, the address of the latter station is stored in the lock address register. In order to activate a circuit as a master station, the control circuit of the application should provide the following information:

the slave station address, the control code and, in the case of a write operation, the data bytes to be transmitted in order to be loaded into the master station buffer, the mode signal, indicating the line mode to be used, and the master station request signal are loaded into the master station command register.

The station subsequently initiates a message and participates, if necessary, in the relevant arbitration procedure. When the frame is terminated after a positive arbitration result, an interrupt signal for the local control system (INT) is given. The local control system can subsequently read the reason of the interrupt signal in the interrupt register (master interrupt, slave transmitter interrupt or slave receiver interrupt). The master status register contains the number of positive acknowledge bits and indicates whether the message was successful. The latter register thus acts as a counter. Moreover, after an interrupt signal in the case of a read operation, the master buffer contains the data received. The interrupt register is reset after having been read: this is effected by an explicit write operation in the register question.

Virtually the same operations are performed for a slave receiver function. The number of positive acknowledge bits is then stored in the slave receiver register. When the slave receiver buffer has been read, the slave receiver command register is filled with the information 00(HEX).

Figure 4:
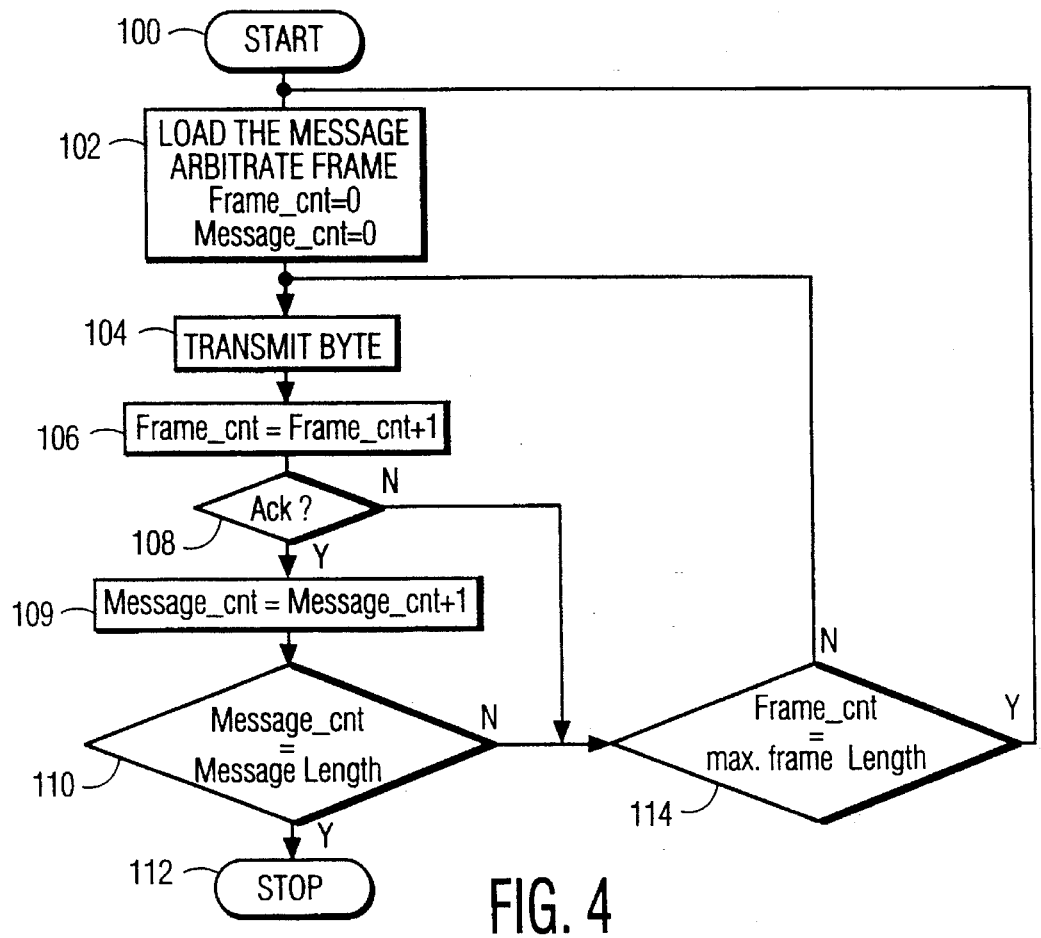
FIG. 4 is a flow chart of a transmitter station procedure.

FIG. 4 is a flow chart of a transmitter station procedure. For this example, the maximum frame load is assumed to be 32 bytes, excluding overhead like start bit, header, master address, slave address, slave control signalization, etc. The maximum message length for the kind of non-locked transfer considered is substantially less, for example 16 bytes. This boundary depends inter alia on the size of the receive buffer: the larger the receive buffer, the more probable the transfer success will be. In block 100 the start is undertaken. In block 102, the message transfer is initialized. As shown, the message is loaded, the frame is arbitrated, the frame byte counter is reset and the message byte counter is reset. It is presumed that the transfer is with master transmitter, that the arbitrage is effectively been won and that the slave receiver responds correctly to slave station address and slave control signalization. If slave transmitter, the operations are the mirror images of those shown here. In block 104 a byte is transmitted and if applicable, the end of message is signalled. In block 106, the frame length counter is incremented. In block 108 the ensuing reception of an acknowledge bit is awaited. If negative, in block 114 the completion of the allowable frame length is tested. If no, the latest byte must be sent once more and the system goes back to block 104. If yes, the message is a failure and must be completely resent, and the system in consequence reverts to block 102. If the acknowledge is positive, in block 109 the message length counter is incremented. In block 110 the completion of the message is tested. If ready, the system exits to block 112. If the message is not yet completed, the system goes also to block 114. In practice, various waiting limits have been realised, for example, exiting if no further bytes arrive during a particular time interval.

Figure 5:
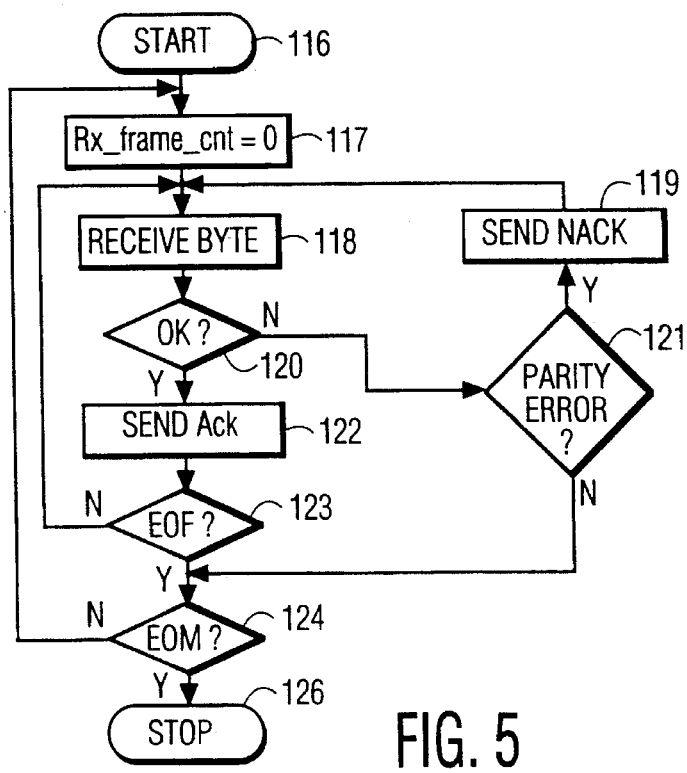
FIG. 5 is a flow chart of a receiver station procedure.

FIG. 5 is a flow chart of a receiver station procedure, that to a certain degree mirrors the operations in FIG. 5. The process begins in block 116, in the same way as has been described with respect to block 100 in FIG. 5. In block 117 the receive frame counter is set to zero. In block 118 a data byte is received. In block 120 a check for correct reception is made, such as by checking for correct panty (also block 121), and by checking for correct storability in the receiver buffer. If negative, the receiver station in block 119 sends a negative acknowledge, and reverts to block 118. If positive, in block 122 the acknowledge bit is sent. Store management of the receiver buffer, such as in the manner of a FIFO store, has not been considered for brevity. If the reception was not OK, and also the parity was wrong, the receiver in block 124 detects whether the end-of-message was received. In block 123 detection of the end-of-frame signalization is done. If negative, the receiver reverts to block 118. In block 124 detection of the end-of-message signalization is done. If positive, the message has been fully received and can be processed further (block 126). If negative, the transfer of the (partial) message has failed, and the system reverts to block 117, while ignoring the reception of any data byte of the frame in question. The system has been kept simple, in that the receiver knows the maximum length of the frame (block 123). the transfer from block 121 to block 124 usually signals that the receive buffer is full. In the above, the formation of the partial messages is usually executed by the station application process that knows the maximum lengths of messages and partial messages, when applicable, and formats them. By itself, the formatting of messages is conventional.

What is claimed is:

1. A multistation single-channel communication bus system accommodating master stations, any master station comprising arbitration means, arbitration outcome detection means, and formatting means for upon winning an arbitration formatting a frame comprising a slave address and slave control signalizations and accommodating a plurality of data byte periods for data transmission from a transmitter station to a receiver station up to a first maximum data byte length, and each period accommodating an acknowledge bit from said receiver station, said transmitter station being arranged for, upon absence of such acknowledge bit for a particular data byte, repeating that data byte, characterized in that said system is arranged for, with respect to intended transfer of a message whose data byte length would exceed said first maximum data byte length, dividing said message into partial messages each of an associated frame data byte count below said first maximum data byte length, and assigning each partial message to a respective bus frame, said system having counting means for counting in a particular frame data byte periods and received acknowledge bits, said transmitter station being arranged for, upon attaining said first maximum data byte length earlier by said data byte periods than said frame data byte count by said acknowledge bits, signalling a frame failure and ignoring any transfer in said particular frame for undertaking a repeat therefor.

2. The system as claimed in claim 1, wherein with respect to a particular message, said partial messages have mutually substantially equal frame data byte counts.

3. The system as claimed in claim 1, wherein said frame data byte count is at most equal to a second maximum data byte length that is lower than said first maximum data byte length.

4. The system as claimed in claim 3, wherein any message whose data byte count would exceed said second maximum data byte length is divided into partial messages.

5. The system as claimed in claim 1, wherein said formatting means are arranged for including in said frame locking and unlocking signalizations for locking and unlocking, respectively, an addressed slave for a duration of a multiple frame message, so that a different station is blocked from, at least in a particular manner, accessing a locked slave within said duration.

6. The system as claimed in claim 1, said bus being a $D^2B$ bus.

* * * * *